US009720470B2

(12) United States Patent
Larsson et al.

(10) Patent No.: US 9,720,470 B2
(45) Date of Patent: Aug. 1, 2017

(54) METHOD AND SYSTEM FOR CONTROLLING THE OPERATION OF AN ELECTRONIC DEVICE

(75) Inventors: Erik G. Larsson, Linköping (SE); Oscar Gustafsson, Linköping (SE)

(73) Assignee: OPTIS CIRCUIT TECHNOLOGY, LLC, Plano, TX (US)

(*) Notice: Subject to any disclaimer, the term of this patent is extended or adjusted under 35 U.S.C. 154(b) by 1091 days.

(21) Appl. No.: 13/696,563

(22) PCT Filed: May 9, 2011

(86) PCT No.: PCT/EP2011/057410
§ 371 (c)(1),
(2), (4) Date: Dec. 7, 2012

(87) PCT Pub. No.: WO2011/138464
PCT Pub. Date: Nov. 10, 2011

(65) Prior Publication Data
US 2013/0091367 A1    Apr. 11, 2013

(30) Foreign Application Priority Data
May 7, 2010    (EP) .................................... 10162325

(51) Int. Cl.
*G06F 1/26* (2006.01)
*G06F 1/32* (2006.01)
*G06F 9/48* (2006.01)

(52) U.S. Cl.
CPC .............. *G06F 1/26* (2013.01); *G06F 1/3203* (2013.01); *G06F 1/324* (2013.01); *G06F 1/3296* (2013.01);
(Continued)

(58) Field of Classification Search
CPC ...... G06F 1/3203; G06F 1/324; G06F 1/3287; G06F 1/3296; G06F 9/505
See application file for complete search history.

(56) References Cited

U.S. PATENT DOCUMENTS

| | | | |
|---|---|---|---|
| 2003/0058929 A1* | 3/2003 | Cox ....................... | H04B 1/707 375/150 |
| 2004/0153679 A1* | 8/2004 | Fitton ................... | G06F 1/3209 713/322 |

(Continued)

OTHER PUBLICATIONS

Shafique, M., et al., "3-tier dynamically adaptive power-aware motion estimator for h.264/AVC video encoding." Proceedings of the 13th International Symposium on Low Power Electronics and Design, Bangalore, India. Aug. 11, 2008. pp. 147-152.

(Continued)

*Primary Examiner* — Kim Huynh
*Assistant Examiner* — Brandon Kinsey
(74) *Attorney, Agent, or Firm* — The Danamraj Law Group, P.C.; Thomas L. Crisman; Kenneth A. McClure (57) ABSTRACT

The present invention relates to a method for controlling the operation of an electronic device for processing data, said device comprising at least one computational unit for receiving input data and processing said input data for generating output data, and further comprising a control unit for receiving at least a part of said input data and delivering at least one control signal to said at least one computational unit for controlling the operation of said at least one computational unit, characterized in said control unit using said input data to determine a computational effort and further using said control signal to control parameters of said at least one computational unit depending on said computational effort, wherein said parameters comprise a combination of: clock rate and/or supply voltage; and process complexity.

22 Claims, 4 Drawing Sheets

(52) U.S. Cl.
 CPC ........ *G06F 9/4881* (2013.01); *Y02B 60/1217* (2013.01); *Y02B 60/1285* (2013.01); *Y02B 60/144* (2013.01)

(56) References Cited

U.S. PATENT DOCUMENTS

| | | | |
|---|---|---|---|
| 2008/0059823 A1 | 3/2008 | Balatsos et al. | |
| 2008/0301474 A1* | 12/2008 | Bussa | G06F 1/3203 713/300 |
| 2009/0034639 A1 | 2/2009 | Hwang et al. | |
| 2009/0172424 A1* | 7/2009 | Cai et al. | 713/300 |
| 2010/0153687 A1* | 6/2010 | Koda et al. | 712/36 |
| 2010/0332869 A1* | 12/2010 | Hsin et al. | 713/320 |
| 2011/0145615 A1* | 6/2011 | Rychlik et al. | 713/323 |

OTHER PUBLICATIONS

Gutnik, V. et al., "Embedded Power Supply for Low-Power DSP." IEEE Transactions on Very Large Scale Integration (VLSI) Systems, vol. 5, No. 4, Dec. 1, 1997. pp. 425-435.

Chandrakasan, A. et al., "Data Driven Signal Processing: An Approach for Energy Efficient Computing." Proceedings of the International Symposium on Low Power Electronics and Design (ISLPED), Jan. 1, 1996. pp. 347-352.

\* cited by examiner

METHOD AND SYSTEM FOR CONTROLLING THE OPERATION OF AN ELECTRONIC DEVICE

TECHNICAL FIELD

The present invention relates generally to a method, logic circuitry, mobile communication device, computer program product and system for controlling the operation of an electronic device for processing data. More particularly, the present invention relates to a method, logic circuitry, computer program product and system for controlling a data processing device dependent on load related parameters.

BACKGROUND

Electronic devices for performing digital signal processing are becoming increasingly common within multiple technical fields, and with the increasing number of mobile devices and systems usually having a limited space for processing components there is an increasing demand for performing complex computations at high speed while at the same time optimising the performance of the system with regard to a number of parameters.

Especially in areas where computationally demanding tasks are to be performed, such as separating and processing information in data streams received by a plurality of antennas that are affected by cross-talk, a phenomenon where signals or data streams transmitted in one circuit are affected by signals or data streams transmitted in another, optimising the operation of the processing device, such as a multiple-input multiple-output (MIMO) communication receiver, is critical in order to achieve satisfactory results. MIMO receivers may be used for instance in the technical fields of telecommunication, radio communication and radar.

RELATED ART

One method for supporting a plurality of MIMO modes in a wireless communication system is shown by US2009/0034639 (Hwang), where the operation of a series of MIMO modes is controlled. The method presented does not, however, take into account the situations that may arise when communication devices that are running on a limited power supply are used, and does not present a solution suitable for use with such limited resources.

The related art document, US2008/0059823 A1 (Balatsos et al.), shows a battery-powered device with reduced power consumption and a method thereof. This piece of related art describes a solution for reducing energy consumption in a video coder that receives a single data stream.

Related art is further shown in the document "3-Tier Dynamically Adaptive Power-Aware Motion Estimator for H.264/AVC Video Encoding" (Shafique et al.), Proceeding of the 13th International Symposium on Low Power Electronics and Design (2008-08-11), pages 147-152. This piece of related art describes a solution for reducing energy consumption in a video coder that receives a single data stream.

None of the listed related art includes all the technical features of the present invention. There is a need for providing an improved method and system for controlling the operation of an electronic device processing data. In particular, there is a need for an improved method and system for controlling the operation of an electronic device processing data in limited resources situations, for example, one or more of limited power, limited physical computational resources, limited time until a result should be ready, etc.

SUMMARY

The object of embodiments of the present invention is to solve or at least to minimise at least some of the problems or disadvantages described above.

This is achieved through a method wherein a control unit uses input data to determine a computational effort and further uses a control signal to control parameters of at least one computational unit depending on said computational effort. According to an exemplary embodiment, said control signal controls two or more parameters. According to a further exemplary embodiment, said parameters comprise a combination of: clock rate and/or supply voltage; and process complexity.

According to further exemplary embodiments, process complexity may be used for selecting and/or adapting an algorithm in one of the at least one computational units. The process complexity may be represented as a selection of the following:

- the number of operations that needs to be performed during the processing of a received input in order to obtain a desired output;
- information indicating that some of the system units are not going to be used during the current processing procedure;
- information indicating which types of operations to use or not to use;
- the number of iterations to use for an iterative process;
- a threshold for when an iterative process should be terminated.

According to an exemplary embodiment, a computational effort is determined for a plurality of computational units, i.e. two or more computational units. According to an exemplary embodiment, the computational effort may be determined from a quality information of the input data. According to a further exemplary embodiment, the computational effort may be determined from an amount of available energy in an energy supply and/or by combining a quality information of a plurality of input data signals or streams and/or be determined as an estimate of a complexity of a process and a desired quality of the input to or output from this process. Thereby, the operation of the one or more computational units can be controlled depending on the input data to that unit, so that resources allotted to the computational unit can be sufficient for performing the computational tasks required while at the same time kept as low as possible. The allotting of resources may refer to deciding which physical resources or computational units are to be used during the processing procedure, deciding how and to what degree different parts of the input should be processed, deciding which computational unit is going to perform which processing step, deciding the parameters for each processing step, or a combination of any or all of the listed alternatives.

According to further aspects and embodiments of the present invention, the object may alternatively be achieved by a method, a logic circuitry, a mobile communication device, a computer program product, a telecommunication platform or a system according to any of the claims 2-25.

By controlling any or all of a number of parameters, the operation of the computational unit or units can be controlled so that a result of a desired quality or at a desired energy consumption is delivered as output data at a desired time. The parameters may be load related parameters.

Among the parameters that can be controlled in this manner are a clock rate, a supply voltage and a process complexity. The clock rate and the supply voltage are examples of hardware related parameters. The process complexity is an example of a software related parameter which may be associated with algorithm adjustments that impact for instance the number of computational steps performed by an algorithm.

According to an exemplary embodiment, the device may comprise a plurality of computational units that may be connected in parallel. According to another exemplary embodiment, the device may comprise a plurality of computational units that may be connected in series.

The speed and quality of the operation of computational units can by altering the parameters for each computational unit individually be controlled so that sufficient but not excessive resources in the form of electrical energy are allotted to the unit and so that the process steps being performed in the unit can be performed within a desired time. The desired time may for instance be determined at runtime, based on one or more of the input 31, 32, 33, 31', 32', 33', 34, 35, and 36, or predetermined. This is especially beneficial when considering large systems with a number of computational units placed in parallel, since every unit can be made to yield output data at the same time, even if the number of process steps differs between the units and if the overall quality of the results also differs. It is also beneficial when considering a number of computational units placed in series, since the delivery of output data from one unit given as input data to the next can be timed in the most beneficial manner and further increase the efficiency of the system of computational units. It can for instance be decided that certain units need to operate at a higher speed and/or yield a result of a higher quality than others and the energy resources can be distributed accordingly.

From each computational unit, a feedback signal can be given to the control unit, thereby giving the opportunity of including this signal as input data for the control unit. Further control signals to the same computational unit or to another, such as that placed directly afterwards in a series, can thereby be affected by the feedback signal which gives an increased possibility of optimising operation of the entire system. The increased possibility of optimising operation of the entire system is obtained since the feedback system enables trading of quality and the energy consumption adaptively.

According to an exemplary embodiment, the received input data may comprise multiple input and the generated output may comprise multiple output (MIMO)

Further advantages and benefits of the invention and the described embodiments thereof will become apparent from the detailed description below.

BRIEF DESCRIPTION OF THE DRAWINGS

The invention will now be described in more detail with reference to the appended drawings, wherein.

DETAILED DESCRIPTION OF THE INVENTION

Introduction

Embodiments of the invention are adapted for controlling the operation of an electronic device for processing data, possibly dependent on load related parameters.

According to an exemplary embodiment, the electronic device is a multiple input multiple output (MIMO) device, the energy consumption of which is to be optimized or at least improved.

According to embodiments of the present invention, an optimization on a combination of quality and energy consumption is performed, through adaptation of the system to a desired trade-off between quality and energy consumption.

In the following, exemplary embodiments of the invention will be described.

System Architecture

Figure 1:
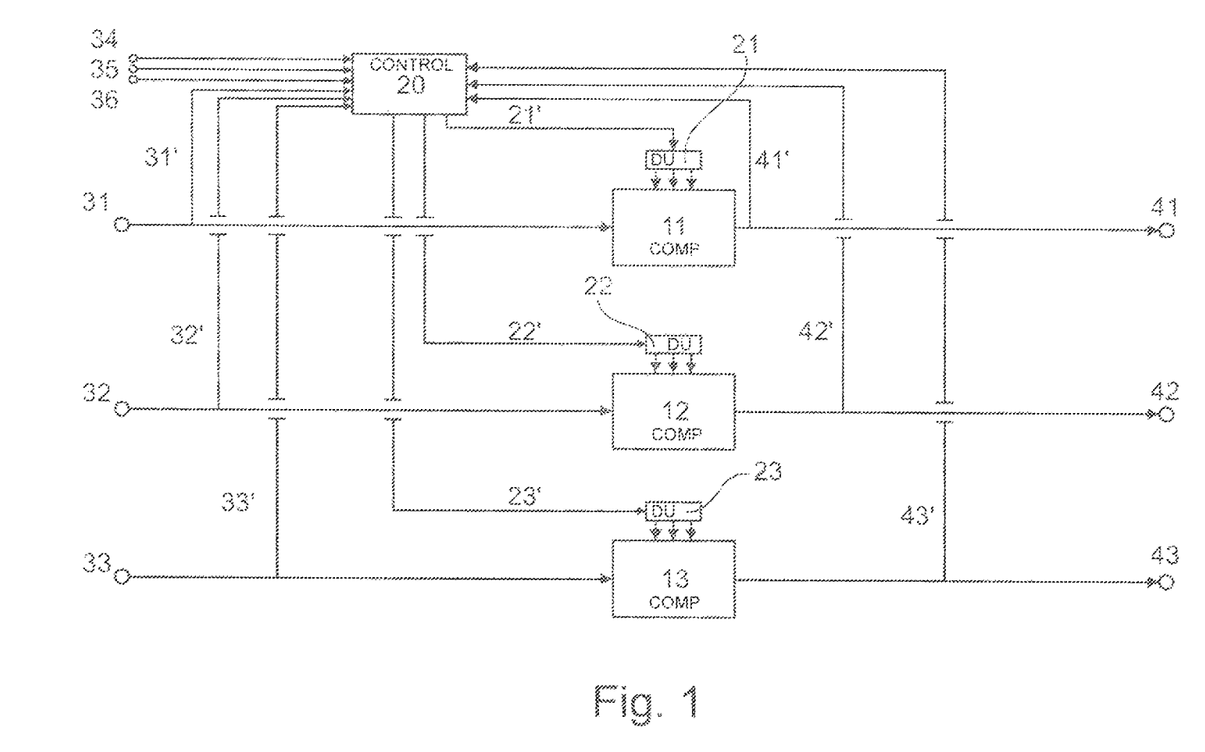
FIG. 1 shows a schematic view of a system according to a first preferred embodiment of the invention.

FIG. 1 shows a first preferred embodiment of a system according to the invention, with three computational units 11, 12, 13 connected in parallel. They each receive input data 31, 32, 33, respectively, and perform a number of operations that result in their respective output data 41, 42, 43. The system also comprises a control unit 20 that receives input data 34, 35, 36 but also input data 31', 32', 33' connected to the input data 31, 32, 33 of each of the computational units 11, 12, 13 and input data 41', 42', 43' connected to the output data 41, 42, 43. Depending on the precise configuration of the control unit 20, any or all of these input data 36, 31', 32', 33', 41', 42', 43' can be combined and processed to determine current conditions in the system as a whole or in any part thereof, or desired properties of the operation of each computational unit 11, 12, 13. The control unit can also receive the input data 31, 32, 33 in their entirety or parts thereof, if desired. If only a part of the input data 31, 32, 33 is to be received, that part can for instance be information regarding a quality of the input data or the number of computational steps required to yield an output from said input data.

According to exemplary embodiments, information regarding the quality of the input may be calculated from, approximated as or set based on one or more of the following: signal-to-interference ratio (S/I or SIR), carrier-to-interference ratio (C/I, CIR), a signal to noise ratio (SNR), signal to interference-plus-noise ratio (SINR), cyclic redundancy check (CRC), Doppler frequency, delay spread, the transfer function or transfer matrix from input antennas to output antennas in a MIMO system (for instance if different signals from different antennas cancel each other out) and any other relevant quality related measure obtainable from the input signal.

The control unit 20 delivers control signals 21', 22', 23' to distributor units 21, 22, 23 that serve to control the operation of the computational units 11, 12, 13 by adjusting a series of parameters, as will be described in more detail below with reference to FIG. 3. It is to be noted, however, that the function of the distributor units 21, 22, 23 can be integrated with the control unit 20 itself or with the computational units 11, 12, 13 in any suitable way as long as the control unit 20 can execute any type of control over the operation of the computational units 11, 12, 13.

According to an exemplary embodiment, the system may be realised as a telecommunication platform adapted to be comprised in a telecommunication device for a telecommunication network.

Input and Output of the System

By thus supplying control parameters that affect the operation of the computational units 11, 12, 13, the input data 31, 32, 33 can be processed to yield the output data 41, 42, 43. The output data 41, 42, 43 can in its turn be given as input data to other computational units or be combined or used independently as output data from the system as a whole.

The operation of the system and method according to this preferred embodiment will now be described.

The system shown in FIG. 1 can be a part of a receiving MIMO device in a wireless network, such as a portable telephone or the like, and the purpose of the system is to process received input data 31, 32, 33, 36 from a series of antennas, for instance, by performing a number of operations in the computational units 11, 12, 13, in order to arrive at output data 41, 42, 43 that can be transmitted to another system for further processing or can be presented directly to a user of a portable phone, for instance.

The input data 31, 32, 33 can be in the form of data streams that are generated at the antennas and can represent one antenna each or be either data streams divided to the computational units 11, 12, 13 from a number of antennas fewer than the number of computational units or data streams combined from a higher number of antennas. The input data 36 is sent to the control unit 20 and can be channel state information (also referred to as CSI) regarding any properties of the antennas, the system or transmission of the input data, for instance. The channel state information may relate to a multiple input multiple output (MIMO) system. Input data 34 can supply system information such as data speed and modulation, while input data 35 supplies information regarding a desired trade-off between energy consumption and quality, as will be described in more detail further below. Input data 31, 32, 33, 34, 35, 36 may be transmitted by means of a telecommunications network. Integrated with any of these input data 34, 35, 36 or separately, information regarding an available energy such as a level of remaining energy in a power supply such as a battery, for instance, can be supplied, and a computational effort can be determined from this amount, among other factors. According to exemplary embodiments, the possibly integrated information may comprise information on that the connectivity is low, or that the input data relates to an emergency message (implying that all input data must be forwarded by the system). Further input data 31', 32', 33' can give information regarding the quality of the input data 31, 32, 33 or describe any other features of this input data.

By using the different kinds of input data 36, 31', 32', 33' received by the control unit 20, comprehensive information regarding the requirements of the computational units 11, 12, 13 for processing the data streams can be constructed. Factors that can be determined include a quality of each of the data streams given as input data 31, 32, 33 as well as the number of calculations needed to arrive at the desired output data 41, 42, 43. It may well be that one of the computational units 11 will perform a significantly higher number of calculations than the others or that another computational unit 12 will receive input data 32 of a higher quality than the others and will be required to deliver a corresponding higher quality of output data 42. By processing such factors, a computational effort for each computational unit 11, 12, 13 can be determined.

Input data of a higher quality may generally require fewer operations to yield a sufficient output, while input data of lower quality require more operations in order to increase the quality sufficiently to achieve suitable output. If the quality of the input data is too low overall, the computational unit 11, 12, 13 receiving the input data may in one embodiment dispense with performing operations on the input data altogether if it is determined that it would be too difficult to achieve at a sufficient quality level in the output data from the computational unit in question.

Control Unit

The control unit 20 receives input 31', 32', 33', 34, 35, 36 and processes said input according to a set of mapping rules to determine what calculations are to be performed by the at least one computational unit 11, 12, 13 of the system. The set of mapping rules are based on a mapping of the output quality obtained through use of one or more algorithms of the system and the computational effort required to perform the steps of said one or more algorithms.

According to an exemplary embodiment, the computational effort may for instance be seen as the number of operations that needs to be performed during the processing of a received input in order to obtain a desired output result. According to another exemplary embodiment, the computational effort may include information concerning that some of the system units are not going to be used during the current processing procedure, or information on which types of operations to use or not to use depending on the desired quality of the output result. As an example, a square root might give a more accurate result than an addition for a certain processing step, but the square root would in most cases be a more complex operation compared to an addition, since it will take longer time and/or more energy to be performed. Therefore, depending on the desired quality of the output result, square roots may be deemed to be too energy consuming and therefore replaced by addition operations. According to a further embodiment, an iterative process could use 1, 2 or 5 iterations, or be allowed to run until a threshold condition is met. Then the computational effort parameter may tell the process how many iterations to use among these 4 alternatives. In another example a similar threshold may have several different values (leading to more or less iterations) which are input by the computational effort parameter, in other words a threshold for when an iterative process should be terminated. Another example may be that the computational effort parameter instructs if e.g. joint detection or interference cancellation should be used or not, or if linear calculations or more complex non-linear calculations should be used, etc.

According to an exemplary embodiment, the basis for the mapping is input data that supplies information regarding the desired trade-off between energy consumption and quality, according to an exemplary embodiment input 35, possibly in combination with information obtained from any or all of the input 31', 32', 33', 34 and 36.

Figure 4:
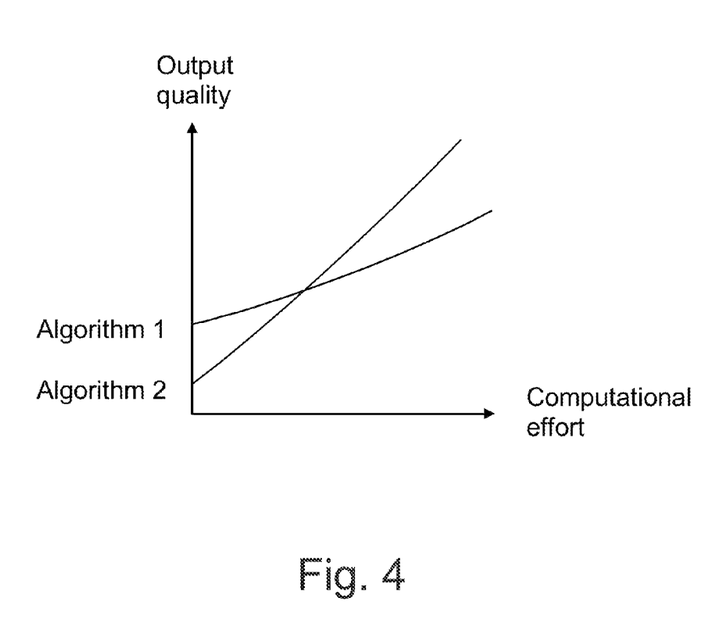
FIG. 4 shows an exemplary relation between quality and computational effort.

According to an exemplary embodiment, the mapping rules are predetermined, and typically calculated or set during an initialization of the system. In this case, the mapping rules may be obtained through simulations of the processing procedure using different input. An example of such a simulation is shown in FIG. 4, wherein the x-axis shows computational effort, for instance the number of calculations to be performed, the y-axis shows output quality and the curves 1 and 2 represent two different algorithms. As can be seen from FIG. 4, algorithm 1 provides higher output quality than algorithm 2 for a low computational effort, whereas the opposite relationship is found for a higher computational effort.

Of course, FIG. 4 only shows a simplified exemplary simulation procedure. In reality, other or additional parameters may be used for simulation purposes.

According to another exemplary embodiment, the mapping rules are calculated at run time. Mapping rules that are calculated at run time allow for finer adjustments than predetermined mapping rules, but require more computational resources and hence are more energy consuming.

The aim of the mapping is optimization of system resource usage and may be expressed as how to obtain a maximum quality per number of operations performed, in other words to compute and maximize a quality to computational effort ratio. The computations are based on the assumption that it is known how long it takes or how many clock cycles are needed for a certain operation to be performed. The algorithms, with a certain set of algorithm parameters, that are found to represent the maximum quality ratio based on input quality, desired output quality and possibly other relevant parameters, are chosen for processing of the received input. The maximum ratio may be computed for each computational unit separately, or for a combination of all computational units that are used during the processing procedure.

According to an exemplary embodiment, the algorithms used in the computational units are fixed complexity algorithms. For fixed complexity algorithms, i.e. algorithms for which the computational effort is known, an optimization of supply voltage and clock frequency may be performed. In the case where the algorithms used are not completely fixed, the parameters used for adaptation are still most likely finite, even though the alternatives may be many. According to an exemplary embodiment, where the electronic device used is a MIMO device, the computational units 11, 12, 13 may contain for instance 10-20 different algorithms. Some of the algorithms may have adjustable parameters and other algorithms and parameters may be fixed. If for example there are 10 different adjustable algorithms and there are further 100 alternative ways of performing each computational step, there will be 10,000 possible quality levels to select from in the mapping between computational effort and output quality.

According to another exemplary embodiment, a certain quantization of the supply voltage is given, whereby the task of optimizing the supply voltage is easier. In this case, it may be of interest to optimize the number of quantization levels in order to obtain the largest possible energy savings.

The more computational units there are in the system and the higher number of input signals, the more alternative ways there may be to process the signals. The number of mapping rules, typically stored in the form of a mapping table, may therefore be very large. However, a very large table of mapping rules may not be optimal, since it may consume a large amount of energy. Therefore, a trade-off between the size of the mapping table and the mapping quality, in other words the precision of the quality per number of operations ratio approximation, may also be needed. According to an exemplary embodiment, the table may be multidimensional and comprise a multiple of input signals or streams and a multiple of possible computational effort for processing of each input signal or stream. For every combination of input and computational effort, there may be several possible output quality levels. The decision of which computational effort to choose may then be decided by selecting an appropriate (possibly maximum) quality level in combination with finding an appropriate (possibly minimum) value in the further dimension of supply voltage, i.e. voltage scaling.

One issue may be how well the optimization solution should be approximated, for instance dependent on how often the channel state information (CSI) is updated, how big a mapping rules table is and how often the table is updated. According to an exemplary embodiment the mapping rules table may be optimized off-line. According to a second exemplary embodiment the mapping rules table may be updated on-line, at a certain time interval. According to a third exemplary embodiment, the mapping rules table may be re-calculated or updated for every received input.

Control Signal

According to a further exemplary embodiment, the computational effort comprised in control signals 21', 22', 23' may consist of a measure of the required computational effort of the computational units 11, 12, 13. In other words, the computational effort may correspond to how many operations, or other kinds of implementations according to an adapted computational structure, that each computational unit 11, 12, 13 is to perform. Said measure may be represented as a voltage level, a frequency, a number representing a level on a scale of quality measures, or be of any other suitable numerical representation. This means that control signals 21', 22', 23' give well-defined answers to how computational units 11, 12, 13 should be set or adapted for processing of the current input.

It is readily apparent to a person skilled in the art that the measure values listed above are just examples, and that the form of the measure values may vary depending on circumstances.

According to an exemplary embodiment, control signals 21', 22', 23' comprising computational effort information are created by the control unit 20. The control unit 20 delivers a series of control signals 21', 22', 23' corresponding to the computational effort to distributor units 21, 22, 23 of each computational unit 11, 12, 13, and a number of parameters controlling the operation of each computational unit 11, 12, 13 are given by the distributor units 21, 22, 23 as further input to the computational units 11, 12, 13. The parameters may comprise a combination of clock rate and/or supply voltage and process complexity. The operation of distributor units 21, 22, 23 is described in further detail in connection with FIG. 3.

Resource Distribution

If for instance one computational unit 11 is to perform a lower number of calculations than the others, parameters controlling algorithms of the computational unit 11 are adjusted. A clock rate of this unit 11 is decreased, allowing a longer processing time while at the same time a power supply to the unit 11 is decreased since the processing time is longer.

By performing such adjustments, the quality or processing speed can be lowered to a level where the output is of an acceptable quality and energy can be saved. By thus adjusting resources supplied to a computational unit 11, a trade-off can be achieved where a small decrease of quality can result in saving a large amount of energy while at the same time delivering an acceptable and sufficient quality of output data. In most devices for performing complex calculations, a careful monitoring of power consumption is important to prevent the device from consuming excessive amounts of energy or running out altogether if the device is portable and battery driven. In an exemplary embodiment, the desired quality of the final result may be a function of external factors, for example the available battery level, so that a circuit that is low on battery is tuned to run slower and/or produce results of lower quality. By, according to the method and system presented herein, carefully monitoring the requirements of each computational unit 11, 12, 13 separately to supply only resources needed to arrive at a desired result, the energy consumption of the entire system can efficiently be optimised. For example, it can be monitored how well a unit performs (e.g. in terms of output quality, error rate, timing, etc.) with given constraints (e.g. hardware related parameters—clock frequency, voltage level, etc.— and software related parameters—parameters that affect the computational complexity of an algorithm for example). Then the control unit or other suitable unit can learn from this monitoring and adapt future parameters accordingly to achieve a desired result. Any computational unit 11, 12, 13 that is to perform calculations that can be slower or of a lower quality than the others can thereby be given less energy and resources be saved for later, when the requirements are different. This control is also very beneficial when a number of parallel computational units 11, 12, 13 are required to deliver their results simultaneously, since the unit or units that perform the less complex calculations can be slowed down to deliver their output data at the desired time and also saving energy by being slower than the others.

Feedback signals from the output data 41', 42', 43' can be given to the control unit 20 for evaluation purposes to determine if the control signals 21', 22', 23' given have yielded the desired results. This can affect future control signals to the same computational unit or to another and serve to continuously adapt the performance of the system to achieve an optimal performance. Alternatively, feedback signals from the computational units 11, 12, 13 that are separate from the output data 41, 42, 43 can be given to the control unit 20. Furthermore, any combination of said feedback signals from computational units 11, 12, 13 and output data 41, 42, 43 may be given as input to the control unit 20.

The control unit 20 can receive a quality information through at least some of its input 36, 31', 32', 33', 41', 42', 43' regarding one of the input data 31, 32, 33 or output data 41, 42, 43 and use this to calculate the computational effort for at least one of the computational units 11, 12, 13. This can be given directly from one of these inputs or be arrived at by combining a plurality of these inputs. According to an exemplary embodiment, the quality information is arrived at through an approximation of a signal parameter, such as for instance signal quality, from a combination of multiple input signals.

As understood herein, a computational unit is a unit suitable for using some kind of input data for arriving at output data by performing some kind of calculations, preferably according to one or more predetermined algorithms that can be adapted to suit the present situation. The adaptation may be performed through selection of one of a plurality of algorithms available to the computational unit, through selection of algorithm parameters for an algorithm used by the computational unit, or through a combination of the two. The input data can be any kind of electronic input such as a data stream for instance, and can be digital or analogue depending on the specific application, as can the output data. A control unit is understood to mean an electronic unit for receiving at least one input data and performing a calculation using this input data to arrive at an output in the form of at least one control signal that serves to adjust a parameter such as a clock rate, a power supply or parameters for an algorithm in another unit. The control unit 20 may also, as is readily apparent to a person skilled in the art, perform more than one calculation using a received input data to arrive at an output in the form of at least one control signal. The parameters may be load related parameters.

A computational effort is an estimate of a complexity of a required process and a desired quality of the input to or output from this process. According to an exemplary embodiment, a computational effort is determined for one or more computational units. Thereby, the operation of the one or more computational units can be controlled depending on the input data to that unit, so that resources allotted to the computational unit can be sufficient for performing the computational tasks required while at the same time kept as low as possible. The allotting of resources may refer to deciding which physical resources or computational units are to be used during the processing procedure, deciding how and to what degree different parts of the input should be processed, deciding which computational unit is going to perform which processing step, deciding the parameters for each processing step, or a combination of any or all of the listed alternatives.

Quality information is taken to mean either an amount of information extracted from a signal, for instance measured in terms of mutual information, or an error rate, or a combination thereof. The mutual information essentially determines the chances that a result is accurate enough so that later processing steps using this result as input data can be successful. The error rate represents a probability that the result is incorrect and is measured in terms of bit error rate or frame error rate, which directly translates into speech quality for a voice call and lost data in a mobile broadband application, respectively.

According to the exemplary embodiments described above, all calculation steps are performed in control unit 20. As is readily apparent to a person skilled in the art, some or all of the computational steps may be performed in other parts of the system, for example in distribution units 21, 22, 23.

Figure 2:
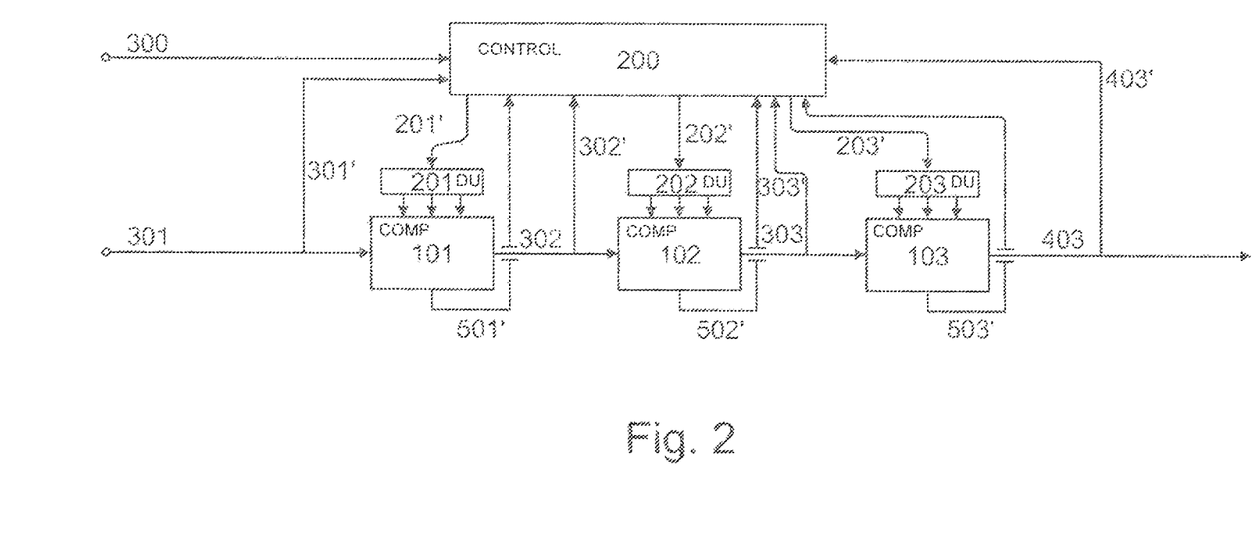
FIG. 2 shows a schematic view of a system according to a second preferred embodiment of the invention.

FIG. 2 shows an alternative embodiment of the method and system according to the invention, where a number of computational units 101, 102, 103 are mounted sequentially. In other words, computational units 101, 102, 103 may be mounted in series. A first computational unit 101 receives an input data 301 and delivers its output data 302 as input data to a second computational unit 102, which in turn delivers its output data 303 to a third computational unit 103 that delivers its output data 403 as output from the system as a whole. A control unit 200 receives input data 300 along with input data from each of the inputs and outputs 301', 302', 303', 403'. Each of the computational units can also give a feedback signal 501', 502', 503', respectively, to the control unit 200. The control unit 200 can process any or all of the input data 300, 301', 302', 303', 403', 501', 502', 503' to determine a computational effort for each of the computational units 101, 102, 103 and transmit control signals 201', 202', 203' corresponding to each of the computational efforts to distribution units 201, 202, 203 that in turn give a series of parameters to each computational unit 101, 102, 103.

The operation of the alternative embodiment of the system shown by FIG. 2 is as a whole similar to that of the embodiment shown in FIG. 1, with the main difference that output from one computational unit now is used as input to another. The computational units 101, 102, 103 are not arranged to give their output data simultaneously, rather, each computational unit should deliver its output data at a time that is convenient for the next unit to receive said data. By controlling the same parameters as described above with reference to FIG. 1, the speed and quality of the different processing steps that each computational unit represents can be adapted to suit the surrounding steps. It may be that one of the steps 101 should give a result of a higher quality than the others or that another of the steps 102 is to perform a higher number of calculations than the others and requires a higher clock rate to complete these calculations in the same time that the unit mounted just before in the sequence so that its output can be given immediately before the time when new input can be received.

These factors, along with others, can be controlled by the control unit 200 and a manner of operation that is good enough to deliver the desired results while at the same time saving energy by delivering results as late as possible and of a lower quality where possible, so that energy can be saved for the times and calculations that require additional resources.

By adjusting a trade-off between energy consumption and performance of the computational units 11, 12, 13, 101, 102, 103 with respect to factors such as speed, quality, computational effort, among others, very beneficial results can be achieved. In many instances, large energy savings can be achieved by small decreases of the quality, and by adjusting the computational units 11, 12, 13, 101, 102, 103 individually further savings can be made. For instance, one computational unit 11 may need to perform many operations at a high pace to be able to produce a desired output, but the other computational units 12, 13 in the same system have fewer operations to perform in order to accomplish their allotted tasks. The energy supply to these other units 12, 13 can therefore be lowered so that they arrive at their results at the same time as the unit 11 with a higher pace, resulting in a large amount of energy being saved. The benefits from allowing these other units 12, 13 to operate at a faster rate are very small if the results from all three units 11, 12, 13 are required at the same time, and by this method adjusting the operation of each of them to fit the individual requirements of each, waiting time in the system can be eliminated and energy saved.

According to an exemplary embodiment, the electronic device is a MIMO device receiving multiple input, for instance multiple streams of data. According to this exemplary embodiment, the different streams of data are processed in different ways and to different degrees, in other words weighted differently, which enables different amounts of supply voltage to be fed to the processing parts of the system, i.e. computational units 11, 12, 13. Furthermore, a higher number of different input streams result in a higher number of possible processing alternatives that may be selected from in order to obtain output with the desired trade-off between quality and energy consumption.

In practice, a combination of the parallel embodiment of FIG. 1 with the sequential embodiment of FIG. 2 can be suitable for use, where some computational units are connected in parallel and others in series in order to achieve at a desired result in a beneficial way. The system can be controlled by a single control unit 20, 200 or by a number of control units that control different aspects of the operation of the computational units or different sections of the system.

Of course, a very small system with only one computational unit 11 can also be employed with a control unit 20 arranged to control the operation of this single unit in an optimal way.

According to a further exemplary embodiment, the control unit 20 may determine in which order the different input signals or streams are to be processed, and possibly at which data speed, in order to obtain the desired output quality.

Distribution Unit

Figure 3:
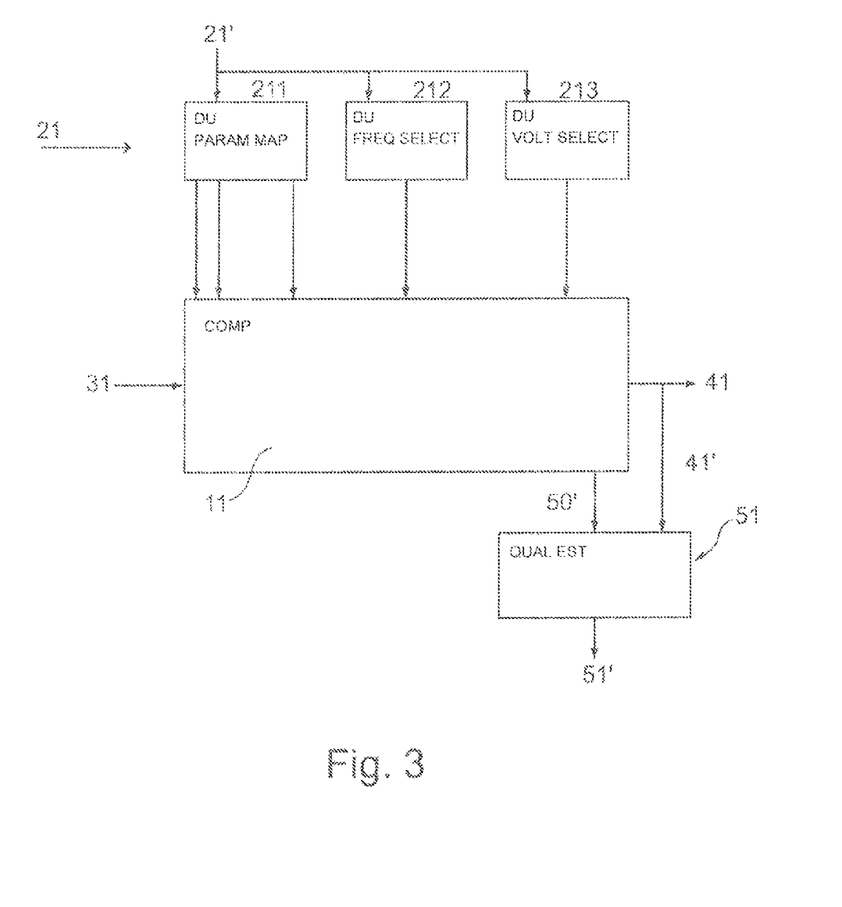
FIG. 3 shows a schematic view of a computational unit along with the different types of input data received and the output data given by the unit.

FIG. 3 shows a detailed schematic view of a computational unit 11 with its input data 31 and output data 41 and with the distribution unit 21 being arranged to perform three different tasks for controlling the operation of the computational unit 11. The distribution unit 21 comprises functional units 211, 212, 213 preferably realised as computer program code for performing these three different tasks.

In a first of these tasks, a parameter mapping 211 serves to determine which parameters to insert for algorithm implementation in the computational unit 11 and these parameters are delivered one by one or in a suitable compact form. The unit for parameter mapping 211 is adapted to derive from the control signal 21' a process complexity for the process to be performed by the computational unit 11. The process complexity determines how the algorithm should be selected and/or adapted in order to obtain a desired quality of the output 41 when the current input 31 is processed in the computational unit 11.

In a second task, a frequency selection 212 determines a suitable clock signal to transmit to the computational unit 11, and in a third task, a voltage selection 213 is determined and a power supply voltage given to the computational unit 11. The unit for frequency selection 212 is adapted to derive the clock signal from the control signal 21'. Correspondingly, the unit for voltage selection 213 is adapted to derive the power supply voltage from the control signal 21'. The determined clock signal may be set such that it ensures that all operations finish on time. On time may for example mean a certain available time for processing the input signals or streams in order not to exceed a predetermined or varying acceptable delay in the system. For example, in an ARQ application decoding must be made within a specified time to be able to transmit ACK/NAK messages in time. As another example, processing in voice applications should meet certain time constraints to not expose the users to a delay that is confusing in a conversation. The voltage may be selected to be the lowest possible voltage that permits the circuit algorithm implementation to operate correctly with the selected clock frequency. These three tasks 211, 212, 213 are a representation of the computational effort determined in the control unit 20 (not shown) for this particular computational unit 11. In other words, distribution unit 21 converts the information comprised in control signal 21', i.e. the computational effort, to parameters that the computational unit 11 can take as direct input. According to an exemplary embodiment, control signal 21' comprises a measure of the computational effort required for the process or algorithm to be performed by the computational unit, in the form of for instance a numerical value representing a certain level on a scale of quality measures. Distribution unit 21 maps the received numerical value to parameters used as input to a processor, a clock and/or a power supply, comprised in or coupled to the computational unit, through algorithm parameter mapping 211, frequency selection 212 and/or voltage selection 213. In other words, the distribution unit 21 enables control of a combination of software and hardware related parts of the computational unit 11. The mapping may be performed by using a mapping table. The mapping table may contain predetermined conversion values, obtained through off-line simulations, for example when the system is initialized. According to another exemplary embodiment, the mapping values may be calculated on-line, at run time, as optimized values for every received control signal 21'. This embodiment enables fine adjustments of the operation of the computational unit 11, but it is computationally expensive and hence energy consuming.

According to an exemplary embodiment, the distribution unit in combination with the control unit may be seen as a software control block that manages both software and hardware control.

According to another exemplary embodiment, the distribution unit in combination with the control unit may be described as comprising an interface enabling conversion of software input and software control signals to control parameters that may be used for control of and/or as direct input to software modules, such as algorithm instantiations of a computational unit, and further control of and/or as direct input to hardware modules, such as a clock or a power supply. A parameter that may be directly input into a hardware module may be received by the interface as a software signal or parameter, converted to a hardware control signal and forwarded as input to the appropriate hardware block.

According to an exemplary embodiment, the interface may be adapted to receive and/or process software layer inputs (for example desired output quality), and it may possibly further be adapted to receive and/or process hardware information (for example available power in a power supply).

The interface described above may be implemented in the control unit or in the distribution unit, in a combined unit comprising the functionality described in connection with the control unit and the distribution unit, or in another separate unit, according to different alternative embodiments.

Further Exemplary Embodiments

As outputs from the computational unit 11, the output data 41 already described in FIG. 1 is given, along with a feedback signal 41' that is transmitted along with a direct feedback signal 50' that are processed in a quality estimation unit 51 to determine the quality of the output signal and of the calculations performed in the computational unit 11. The quality estimation unit 51 gives a quality estimate signal 51' as output to the control unit 20 and this can be used to determine further control signals 21' to this computational unit 11 or others. In this embodiment, the quality estimation unit 51 is separate from the control unit 20, unlike the embodiments of FIG. 1 and FIG. 2 where the feedback and the quality estimation are performed by the control unit 20 itself. In any given embodiment, the implementation that is most suitable can be chosen without affecting the scope of the invention.

A quality information, such as the quality of the output signal 41, may be taken to mean either an amount of information extracted from a signal, for instance measured in terms of mutual information, or an error rate, or a combination thereof. The mutual information essentially determines the chances that a result is accurate enough so that later processing steps using this result as input data can be successful. The error rate represents a probability that the result is incorrect and may be measured in terms of bit error rate or frame error rate, which may translate into for example speech quality for a voice call and lost data and/or throughput in a mobile broadband application, respectively.

The control is realised for example by data streams being executed in a software placed in or in conjunction with the control unit 20, 200, where each data stream can control one or more aspects or functions of the operation of the device or system. This may be realised in the form of a computer program product comprising a computer readable medium having thereon a computer program comprising computer instructions, the computer program being loadable into a data-processing unit and adapted to cause execution of one or more methods described and claimed herein when the computer program is run on a data-processing unit.

In this document, the terms "computer program product" and "computer-readable storage medium" may be used generally to refer to media such as a memory, a storage medium of a processing unit, or a storage medium of the control unit 20, 200. These and other forms of computer-readable storage media may be used to provide instructions to control unit 20, 200, or any of the distributor units 21, 22, 23 and computational units 11, 12, 13 or quality estimation unit 51 for execution. Such instructions, generally referred to as "computer program code" or computer program code portions (which may be grouped in the form of computer programs or other groupings), are adapted to control a data processing system to perform the steps and functions of the inventive method. Thus when executed, the computer program code portions enable the logic circuitry, mobile communication device, data-processing unit or system to perform features or functions of embodiments of the current technology. Further, as used herein, processing logic or logic may include hardware, software, firmware, or a combination of thereof.

The described embodiment may further be performed by general-purpose logic circuitry associated with or integral to a communication device, such as digital signal processors (DSP), central processing units (CPU), co-processing units, field-programmable gate arrays (FPGA) or other programmable hardware, or by specialized logic circuitry such as for example application specific integrated circuits (ASIC). All such forms are contemplated to be within the scope of the invention.

The invention may be embodied within an electronic apparatus comprising logic circuitry or performing methods according to any of the embodiments of the invention, such as for example a portable or handheld mobile radio communication equipment, a mobile radio terminal, a mobile telephone, a pager, a communicator, an electronic organizer, a smartphone, a computer, a notebook, a plug-in card or an embedded drive.

According to an exemplary embodiment, the electronic apparatus is a mobile communication device. The mobile communication device may be connected, through a radio link, to a network. The mobile terminal may comprise an arrangement for control of the operation of an electronic device for processing data. The mobile terminal may further comprise one or more antennas and a man-machine interface for operating the mobile communication device, such as a display, a keypad, a loudspeaker, and a microphone. According to a further exemplary embodiment, the mobile communication device may be a multiple-input multiple-output (MIMO) communication receiver.

The exemplary mobile communication device may be adapted to connect to one or more mobile telecommunication networks via a wireless link.

According to an exemplary embodiment, the computational effort is the energy required to perform an operation at a certain power supply voltage. This can be approximated by the number of operations, possibly weighted by the energy consumption of each operation. As an example, a square root would in most cases be a more complex operation compared to an addition, since the square root will take longer time and/or more energy to be performed.

The invention claimed is:

1. A method for controlling the operation of a Multiple-Input, Multiple-Output (MIMO) electronic communication device, said method comprising:
receiving a plurality of MIMO data streams from a plurality of antennas in a MIMO system of the MIMO electronic communication device;
receiving at a plurality of computational units input data of the MIMO data streams and processing said input data for generating output data in accordance with a process; wherein each of said plurality of computational units is separately monitored for determining process requirements of a particular computational unit;
receiving at a control unit at least a part of said input data;
delivering from the control unit at least one control signal to each of said plurality of computational units for individually controlling the operation of each of said plurality of computational units, said control unit using channel state information of said input data relating to properties of the antennas, the MIMO system, or transmission of the MIMO data streams to determine a computational effort with respect to each computational unit wherein the computational effort is a number of operations to be performed by a respective one of the plurality of computational units during the processing of the received input data; and
using by the control unit said at least one control signal to control parameters of a corresponding one of said plurality of computational units depending on said determined computational effort for the corresponding computational unit, wherein said parameters comprise a combination of:
at least one of a clock rate and a supply voltage; and
a parameter for performing at least one of selecting and adapting an algorithm in the corresponding one of the plurality of computational units.

2. The method according to claim 1, wherein the computational effort is based on at least one of a quality of the input data to the process and a desired quality of output data from the process.

3. The method according to claim 1, wherein the parameter for performing at least one of the selecting and adapting the algorithm comprise at least one of the following:
information indicating which types of operations to use or not to use;
the number of iterations to use for an iterative process; and
a threshold for when an iterative process should be terminated.

4. The method according to claim 1, wherein said computational effort is further determined responsive to an amount of available energy in an energy supply.

5. The method according to claim 1, wherein each of said plurality of computational units delivers a feedback signal to said control unit.

6. The method according to claim 5, wherein said control unit determines said computational effort for respective computational units based at least partly on said feedback signal received from each computational unit.

7. The method according to claim 1, wherein said plurality of computational units are connected in a series.

8. The method of claim 1, wherein said plurality of computational units are connected in parallel.

9. A logic circuitry for controlling the operation of a Multiple-Input, Multiple-Output (MIMO) electronic communication device, said logic circuitry comprising:
a plurality of computational units for receiving input data of a plurality of MIMO data streams received by a plurality of antennas in a MIMO system of the MIMO electronic communication device and for processing said received input data in accordance with a process; wherein each of said plurality of computational units is separately monitored for determining process requirements of a particular computational unit;
and
a control unit for receiving at least a part of said input data and delivering at least one control signal to each of said plurality of computational units for individually controlling the operation of each of said plurality of computational units,
said control unit using channel state information of said input data relating to properties of the antennas, the MIMO system, or transmission of the MIMO data streams to determine a computational effort with respect to each computational unit, wherein the computational effort is a number of operations to be performed by a respective one of the plurality of computational units during the processing of the received input data, and further using said at least one control signal to control parameters of a corresponding one of said plurality of computational units depending on said determined computational effort for the corresponding computational unit, wherein said parameters comprise a combination of:
at least one of a clock rate and supply voltage; and
a parameter for performing at least one of selecting and adapting an algorithm in the corresponding one of the plurality of computational units.

10. The logic circuitry according to claim 9, wherein the control unit is further adapted to determine the computational effort based on at least one of a received quality of the input data and a received desired quality of the output data.

11. The logic circuitry according to claim 9, further comprising at least one distribution unit adapted to convert the information comprised in the at least one control signal to parameters representing algorithm selection, algorithm adaptation, frequency selection and voltage selection with respect to each computational unit.

12. The logic circuitry according to claim 9, wherein each of the plurality of computational units is further adapted to deliver a feedback signal to said control unit.

13. The logic circuitry according to claim 12, wherein said control unit is adapted to determine said computational effort for respective computational units based at least partly on said feedback signal received from each computational unit.

14. The logic circuitry according to claim 13, wherein said plurality of computational units are connected in a series.

15. The logic circuitry according to claim 9, wherein the plurality of computational units are connected in parallel.

16. A Multiple-Input, Multiple-Output (MIMO) mobile communication device comprising:
a plurality of antennas in a MIMO system of the MIMO mobile communication device for receiving a plurality of MIMO data streams;
a logic circuitry for controlling the operation of the MIMO mobile communication device for processing information in MIMO data streams received by a plurality of antennas, said logic circuitry comprising:
a plurality of computational units for receiving input data of the MIMO data streams and for processing said received input data; wherein each of said plurality of computational units is separately monitored for determining process requirements of a particular computational unit;
and a control unit for receiving at least part of said input data and delivering at least one control signal to each of said plurality of computational units for individually controlling the operation of each of said plurality of computational units, said control unit using channel state information of said input data relating to properties of the antennas, the MIMO system, or transmission of the MIMO data streams to determine a computational effort with respect to each computational unit, wherein the computational effort is a number of operations to be performed by a respective one of the plurality of computational units during the processing of the received input data, and further using said at least one control signal to control parameters of a corresponding one of said plurality of computational units depending on said determined computational effort for the corresponding computational unit, wherein said parameters comprise a combination of:

at least one of a clock rate and a supply voltage; and a parameter for performing at least one of selecting and adapting an algorithm in the corresponding one of the plurality of computational units.

17. A Multiple-Input, Multiple-Output (MIMO) mobile communication device, said device comprising a plurality of computational units and a control unit, the device being configured to:

receive a plurality of MIMO data streams from a plurality of antennas in a MIMO system of the MIMO mobile communication device:

receive at the plurality of computational units input data of the MIMO data streams and process said input data for generating output data; wherein each of said plurality of computational units is separately monitored for determining process requirements of a particular computational unit;

receive at the control unit at least a part of said input data;

deliver from the control unit at least one control signal to each of said plurality of computational units for individually controlling the operation of each of said plurality of computational units, said control unit using channel state information of said input data relating to properties of the antennas, the MIMO system, or transmission of the MIMO data streams to determine a computational effort with respect to each computational unit, wherein the computational effort is a number of operations to be performed by a respective one of the plurality of computational units during the processing of the received input data; and the control unit configured to use said at least one control signal to control parameters of a corresponding one of said plurality of computational units depending on said determined computational effort for the corresponding computational unit, wherein said parameters comprise a combination of:

at least one of a clock rate and a supply voltage; and a parameter for performing at least one of selecting and adapting an algorithm in the corresponding one of the plurality of computational units.

18. A computer program product comprising a non-transitory computer readable medium for controlling the operation of a Multiple-Input, Multiple-Output (MIMO) electronic communication device, the computer program comprising software instructions which, when run on the MIMO device, cause the MIMO device to perform the following:

receiving a plurality of MIMO data streams from a plurality of antennas in a MIMO system of the MIMO electronic communication device;

receiving at a plurality of computational units input data of the MIMO data streams and processing said input data for generating output data in accordance with a process; wherein each of said plurality of computational units is separately monitored for determining process requirements of a particular computational unit;

receiving at a control unit at least a part of said input data;

delivering from the control unit at least one control signal to each of said plurality of computational units for individually controlling the operation of each of said plurality of computational units, said control unit using channel state information of said input data relating to properties of the antennas, the MIMO system, or transmission of the MIMO data streams to determine a computational effort with respect to each computational unit wherein the computational effort is a number of operations to be performed by a respective one of the plurality of computational units during the processing of the received input data;

wherein each of said plurality of computational units is separately monitored for determining process requirements of a particular computational unit;

and using by the control unit said at least one control signal to control parameters of a corresponding one of said plurality of computational units depending on said determined computational effort for the corresponding computational unit, wherein said parameters comprise a combination of:

at least one of a clock rate and a supply voltage;

and a parameter for performing at least one of selecting and adapting an algorithm in the corresponding one of the plurality of computational units.

19. A telecommunication platform for controlling the operation of a Multiple-Input, Multiple-Output (MIMO) electronic communication device, said telecommunication platform comprising:

a plurality of computational units for receiving input data of a plurality of MIMO data streams received by a plurality of antennas in a MIMO system of the MIMO electronic communication device and for processing said received input data; wherein each of said plurality of computational units is separately monitored for determining process requirements of a particular computational unit;

and a control unit for receiving at least a part of said input data and delivering at least one control signal to each of said plurality of computational units for individually controlling the operation of each of said plurality of computational units, said control unit using channel state information of said input data relating to properties of the antennas, the MIMO system, or transmission of the MIMO data streams to determine a computational effort with respect to each computational unit, wherein the computational effort is a number of operations to be performed by a respective one of the plurality of computational units during the processing of the received input data, and further using said at least one control signal to control parameters of a corresponding one of said plurality of computational units depending on said determined computational effort for the corresponding computational unit, wherein said parameters comprise a combination of:
at least one of a clock rate and supply voltage; and
a parameter for performing at least one of selecting and adapting an algorithm in the corresponding one of the plurality of computational units.

20. A telecommunication platform for controlling the operation of a Multiple-Input, Multiple-Output (MIMO) electronic communication device, said telecommunication platform being configured to perform the following:
receive a from a plurality of antennas in a MIMO system of the MIMO mobile communication device:
receive at a plurality of computational units input data of plurality of MIMO data streams by a plurality of antennas in a MIMO system of the MIMO electronic communication device and processing said input data for generating output data; wherein each of said plurality of computational units is separately monitored for determining process requirements of a particular computational unit;
receive at the control unit at least a part of said input data;
deliver from the control unit at least one control signal to each of said plurality of computational units for individually controlling the operation of each of said plurality of computational units, said control unit using channel state information of said input data relating to properties of the antennas, the MIMO system, or transmission of the MIMO data streams to determine a computational effort with respect to each computational unit, wherein the computational effort is a number of operations to be performed by a respective one of the plurality of computational units during the processing of the received input data;
the control unit configured to use said at least one control signal to control parameters of a corresponding one of said plurality of computational units depending on said determined computational effort for the corresponding computational unit, wherein said parameters comprise a combination of:
at least one of a clock rate and a supply voltage; and
a parameter for performing at least one of selecting and adapting an algorithm in the corresponding one of the plurality of computational units.

21. A system for controlling the operation of a Multiple-Input, Multiple-Output (MIMO) electronic communication device, said system comprising:
a plurality of computational units arranged to receive an input data of a plurality of MIMO data streams received by a plurality of antennas and perform at least one operation on said input data to yield an output data; wherein each of said plurality of computational units is separately monitored for determining process requirements of a particular computational unit; and
a control unit arranged to receive at least a part of said input data and to deliver at least one control signal to each of said plurality of computational units for individually controlling the operation of each of said plurality of computational units said control unit being arranged to use said input data to determine a computational effort with respect to each computational unit, wherein the computational effort is a number of operations to be performed by a respective one of the plurality of computational units during the processing of the received input data, and further being arranged to use said at least one control signal to control parameters of a corresponding one of said plurality of computational units depending on said determined computational effort for the corresponding computational unit, wherein said parameters comprise a combination of:
at least one of a clock rate and a supply voltage; and
a parameter for performing at least one of selecting and adapting an algorithm in the corresponding one of the plurality of computational units.

22. A system for controlling the operation of a Multiple-Input, Multiple-Output (MIMO) electronic communication device, said telecommunication platform being configured to perform the following:
receive at a plurality of computational units input data of plurality of MIMO data streams received by a plurality of antennas and processing said input data for generating output data;
wherein each of said plurality of computational units is separately monitored for determining process requirements of a particular computational unit;
receive at a control unit at least a part of said input data; and deliver from the control unit at least one control signal to each of said plurality of computational units for individually controlling the operation of each of said plurality of computational units, said control unit using channel state information of said input data to determine a computational effort with respect to each computational unit, wherein the computational effort is a number of operations to be performed by a respective one of the plurality of computational units during the processing of the received input data,
the control unit configured to use said at least one control signal to control parameters of a corresponding one of said plurality of computational units depending on said determined computational effort for the corresponding computational unit, wherein said parameters comprise a combination of:
at least one of a clock rate and a supply voltage; and
a parameter for performing at least one of selecting and adapting an algorithm in the corresponding one of the plurality of computational units.

* * * * *